United States Patent Office.

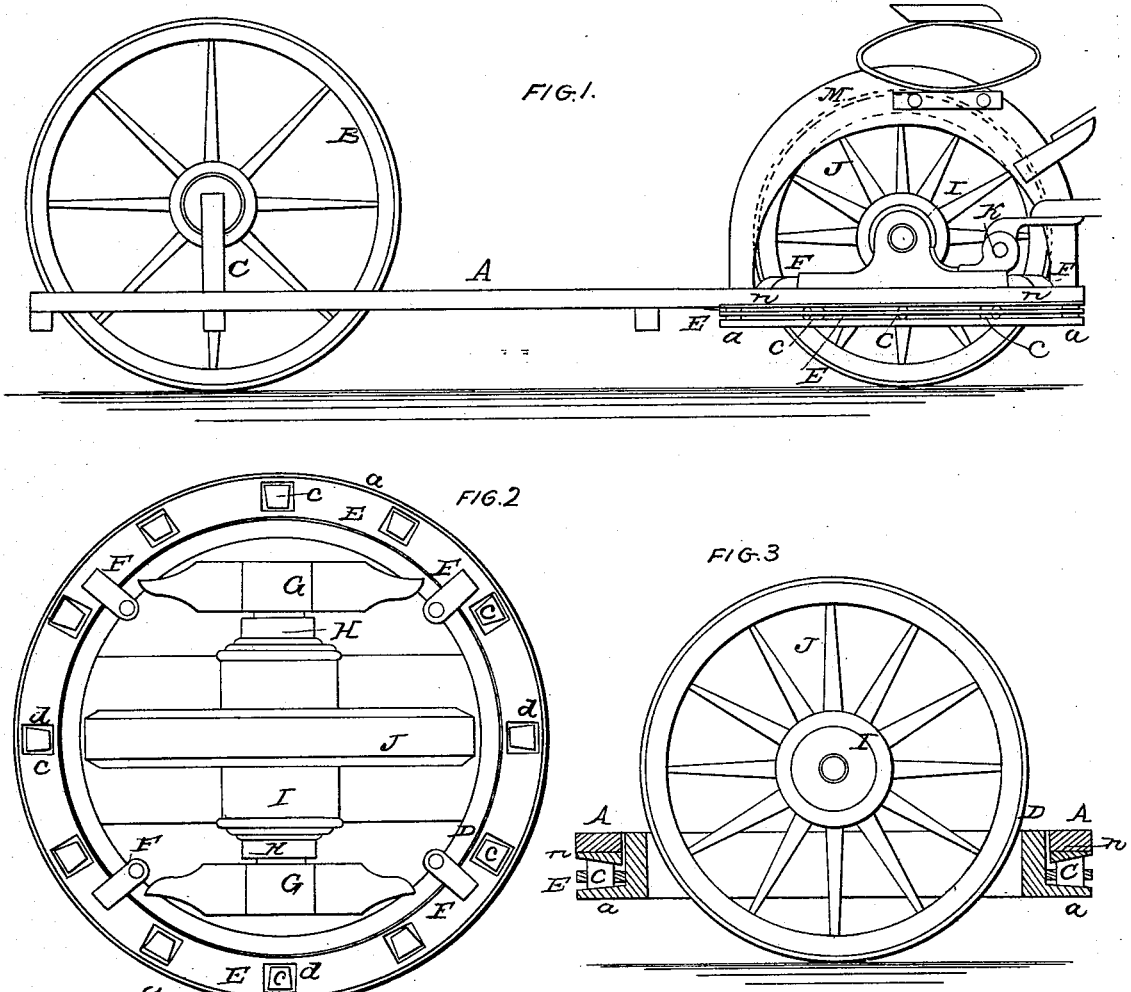

JOHN D. ROSS AND MARTIN KEEVER BURK, OF TRUCKEE, CALIFORNIA.

Letters Patent No. 110,396, dated December 20, 1870.

---

IMPROVEMENT IN VEHICLES.

---

The Schedule referred to in these Letters Patent and making part of the same.

---

*To all whom it may concern:*

Be it known that we, JOHN D. ROSS and MARTIN KEEVER BURK, of Truckee, county of Nevada, State of California, have invented an Improved Construction of Vehicles; and we do hereby declare the following description and accompanying drawing are sufficient to enable any person skilled in the art or science to which it most nearly appertains to make and use our said invention or improvements without further invention or experiment.

Our invention relates to an improvement in the construction of vehicles, and one more particularly applicable to the construction of heavy trucks, in which connection it will be herein described.

It consists in so mounting the front part of the vehicle that it shall ride upon one or two wheels, whose axle is supported in boxes on a horizontally-rotating rim or fifth-wheel.

This rim moves within an opening in the front part of the trucks or vehicle, so that, as the horses move from one side or the other, the vehicle will turn easily as on a pivot, and, when moving forward, it relieves the horses from the strain of the pole or shafts, which is so great on rough pavements or irregular ground when the ordinary style of widely-separated wheels is used.

It also relates to the use of a device for relieving the horizontal rim from friction when turning from side to side.

Referring to the accompanying drawing for a more complete explanation of our invention—

A is the floor of a truck for carrying loads, this being the form of vehicle in connection with which our invention is here described.

B B are the rear wheels, turning on the ordinary bent axle C, as shown.

The front part of the floor A may be rounded or otherwise suitably formed, and has a circular opening made through it large enough to admit the rim or fifth-wheel D.

This rim is made so as to just fill the opening and turn easily, its upper surface being flush with the top of the truck-floor.

At the lower edge a flange, *a*, is formed, which extends beyond the rim and supports the front part of the trucks.

In order to prevent or lessen the friction which would occur between this flange and the edge of the opening, we introduce a series of rollers, *c c*, around the outer edge of the flange *a*, and between it and the opposing surface.

Upon these the surfaces move easily and with very little friction.

To keep these rollers in place, an independent rim E, is made to lie on the flange *a*, and between it and the floor of the truck.

Holes *d d* are made through the rim E at proper points, and through this the rollers *c* project to each side.

The lower part of the floor is protected by an iron rim or band *n*.

The rollers *c* are made conical or tapering in form, and the lower face of the rim *n*, Figure 3, upon which they bear, is beveled, so that they rest upon their whole length and move freely.

The upper part of the rim D may be kept to its place by buttons or lugs F, or by a flange, if desired.

Boxes G G are secured at each side of this rim, and in these the journals of an axle, H, turn; or, if found more desirable, the ends of the axle may be made fast and the wheel be allowed to turn upon it.

The hub I must be made of sufficient length to insure steadiness and firmness in its attachment to the axle.

The wheel J is made strong, with dodge-spokes and a broad, heavy tire, to prevent its sinking too deeply in soft spots or wearing too rapidly.

The shafts are attached to the rim D by a joint, K, or other suitable device.

The seat L is mounted on springs, as usual, and attached to a cover or housing, M, which protects the driver from the dirt which is thrown from the wheels.

If the load is to be very heavy, or if one wheel is inclined to dig too deeply into the ground when turning, two wheels may be employed upon the axle H, at a short distance apart, so as to be within the rim D.

By this arrangement the truck or other vehicle can be easily turned in either direction. The horse is relieved from the strain and blows of the shafts which result from placing the front wheels at each side of the vehicle, especially upon rough pavements.

It is also possible to turn the horse around, so as to be completely out of the way in cases of necessity, where there is not sufficient space for him to stand in front of the truck.

Having thus described our invention,

What we claim, and desire to secure by Letters Patent, is—

1. A truck-coupling, consisting of the horizontal rotating rim D, supported by the wheel J, and moving in the opening in the floor A, so as to turn said wheel in any direction, substantially as herein described.

2. The device for reducing friction, consisting of the rollers $c$ and guiding-plate E, operating between the rims $a$ and $n$ of the truck, substantially as specified.

3. The truck constructed with three wheels, B, B, and J, when mounted and operating substantially as herein described.

In witness that the above-described invention is claimed by us we have hereunto set our hands and seals.

JOHN D. ROSS. [L. S]
MARTIN KEEVER BURK. [L. S.]

Witnesses:
D. H. RHODES,
A. M. WALKER.